United States Patent
Brewer

(10) Patent No.: US 11,831,543 B2
(45) Date of Patent: *Nov. 28, 2023

(54) FLOW CONTROL FOR A MULTIPLE FLOW CONTROL UNIT INTERFACE

(71) Applicant: Micron Technology, Inc., Boise, ID (US)

(72) Inventor: Tony Brewer, Plano, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/744,158

(22) Filed: May 13, 2022

(65) Prior Publication Data
US 2022/0278924 A1     Sep. 1, 2022

Related U.S. Application Data

(63) Continuation of application No. 17/007,468, filed on Aug. 31, 2020, now Pat. No. 11,362,939.

(51) Int. Cl.
*H04L 45/586* (2022.01)
*H04L 45/74* (2022.01)
(Continued)

(52) U.S. Cl.
CPC ........... *H04L 45/38* (2013.01); *H04L 45/586* (2013.01); *H04L 45/74* (2013.01); *H04L 49/3072* (2013.01); *H04L 69/22* (2013.01)

(58) Field of Classification Search
CPC ....... H04L 45/38; H04L 45/586; H04L 45/74; H04L 49/3072; H04L 69/22; H04L 49/9047

See application file for complete search history.

(56) References Cited

U.S. PATENT DOCUMENTS 6,515,963 B1   2/2003   Bechtolsheim et al.
7,042,842 B2   5/2006   Paul et al.
(Continued)

FOREIGN PATENT DOCUMENTS

CN   116235479 A   6/2023
CN   116250218 A   6/2023
(Continued)

OTHER PUBLICATIONS

"International Application Serial No. PCT US2021 038392, International Preliminary Report on Patentability dated Mar. 9, 2023", 5 pages.

(Continued)

*Primary Examiner* — Mohamed A Kamara
(74) *Attorney, Agent, or Firm* — Schwegman Lundberg & Woessner, P.A.

(57) ABSTRACT

Implementations of the present disclosure are directed to systems and methods for flow control using a multiple flit interface. A credit return field is used in a credit-based flow control system to indicate that one or more credits are being returned to a sending device from a receiving device. Based on the number of credits available, the sending device determines whether to send device or wait until more credits are returned. The amount of buffer space used by the receiver to store the packet is determined by the number of transfer cycles used to receive the packet, not the number of flits comprising the packet. This is enabled by having the buffer be as wide as the bus. The receiver returns credits to the sender based on the number of buffer rows used to store the received packet, not the number of flits comprising the packet.

20 Claims, 9 Drawing Sheets

(51) Int. Cl.
*H04L 49/00* (2022.01)
*H04L 45/00* (2022.01)
*H04L 69/22* (2022.01)

(56) References Cited

U.S. PATENT DOCUMENTS

| | | | |
|---|---|---|---|
| 7,103,672 | B1 | 9/2006 | Sharma |
| 7,536,473 | B2* | 5/2009 | Ajanovic .................. G06F 5/06 370/231 |
| 9,515,961 | B2 | 12/2016 | Guo et al. |
| 10,671,554 | B1 | 6/2020 | Bharadwaj |
| 11,356,378 | B2 | 6/2022 | Brewer et al. |
| 11,362,939 | B2 | 6/2022 | Brewer |
| 11,580,044 | B2 | 2/2023 | Brewer |
| 11,588,745 | B2 | 2/2023 | Pospesel |
| 2002/0120808 | A1 | 8/2002 | Dyck et al. |
| 2003/0193927 | A1 | 10/2003 | Hronik |
| 2006/0056292 | A1 | 3/2006 | Mayhew et al. |
| 2007/0053350 | A1* | 3/2007 | Spink .................. H04L 49/9047 370/381 |
| 2007/0233918 | A1 | 10/2007 | Check et al. |
| 2008/0189504 | A1 | 8/2008 | Hughes |
| 2009/0055496 | A1 | 2/2009 | Garg et al. |
| 2010/0146162 | A1 | 6/2010 | Wagh et al. |
| 2010/0158023 | A1 | 6/2010 | Mukhopadhyay et al. |
| 2011/0032947 | A1* | 2/2011 | Brueggen ........... H04L 47/6275 370/412 |
| 2013/0051397 | A1* | 2/2013 | Guo .................. H04L 45/00 370/400 |
| 2014/0112339 | A1 | 4/2014 | Safranek et al. |
| 2014/0115208 | A1 | 4/2014 | Willey et al. |
| 2015/0109024 | A1 | 4/2015 | Abdelfattah et al. |
| 2016/0179427 | A1 | 6/2016 | Jen et al. |
| 2016/0188500 | A1 | 6/2016 | Morris et al. |
| 2016/0283375 | A1 | 9/2016 | Das Sharma et al. |
| 2016/0299699 | A1 | 10/2016 | Vanaraj et al. |
| 2017/0026300 | A1 | 1/2017 | Rimmer et al. |
| 2017/0063693 | A1* | 3/2017 | Kumar ............... H04L 43/062 |
| 2017/0091108 | A1 | 3/2017 | Arellano et al. |
| 2017/0109315 | A1 | 4/2017 | Safranek et al. |
| 2017/0195245 | A1 | 7/2017 | Bhatia et al. |
| 2018/0004702 | A1 | 1/2018 | Pappu et al. |
| 2018/0011759 | A1 | 1/2018 | Willey et al. |
| 2018/0039593 | A1 | 2/2018 | Debbage et al. |
| 2018/0188998 | A1 | 7/2018 | Shaharabany et al. |
| 2019/0065086 | A1 | 2/2019 | Margetts et al. |
| 2019/0243700 | A1 | 8/2019 | Brewer |
| 2019/0278522 | A1 | 9/2019 | Moon et al. |
| 2019/0324928 | A1 | 10/2019 | Brewer |
| 2019/0340019 | A1 | 11/2019 | Brewer |
| 2019/0340020 | A1 | 11/2019 | Brewer |
| 2019/0340023 | A1 | 11/2019 | Brewer |
| 2019/0340024 | A1 | 11/2019 | Brewer |
| 2019/0340027 | A1 | 11/2019 | Brewer |
| 2019/0340035 | A1 | 11/2019 | Brewer |
| 2019/0340154 | A1 | 11/2019 | Brewer |
| 2019/0340155 | A1 | 11/2019 | Brewer |
| 2020/0050398 | A1 | 2/2020 | Meyerowitz et al. |
| 2020/0067814 | A1 | 2/2020 | Zheng et al. |
| 2020/0081857 | A1 | 3/2020 | Barner |
| 2020/0116783 | A1 | 4/2020 | Kalva et al. |
| 2020/0183869 | A1 | 6/2020 | Mikos |
| 2021/0029062 | A1 | 1/2021 | Shan et al. |
| 2021/0117350 | A1 | 4/2021 | Safranek et al. |
| 2022/0066967 | A1 | 3/2022 | Brewer |
| 2022/0070089 | A1 | 3/2022 | Brewer |
| 2022/0070107 | A1 | 3/2022 | Pospesel |
| 2022/0070108 | A1 | 3/2022 | Brewer et al. |
| 2022/0122668 | A1 | 4/2022 | Brewer |
| 2022/0263769 | A1 | 8/2022 | Brewer et al. |
| 2023/0118039 | A1 | 4/2023 | Brewer |

FOREIGN PATENT DOCUMENTS

| | | |
|---|---|---|
| CN | 116261849 A | 6/2023 |
| WO | WO-2022046252 A1 | 3/2022 |
| WO | WO-2022046253 A1 | 3/2022 |
| WO | WO-2022046254 A1 | 3/2022 |
| WO | WO-2022046255 A1 | 3/2022 |

OTHER PUBLICATIONS

"International Application Serial No. PCT US2021 038401, International Preliminary Report on Patentability dated Mar. 9, 2023", 6 pages.

"International Application Serial No. PCT US2021 038407, International Preliminary Report on Patentability dated Mar. 9, 2023", 7 pages.

"International Application Serial No. PCT US2021 038413, International Preliminary Report on Patentability dated Mar. 9, 2023", 6 pages.

"International Application Serial No. PCT/US2021/038392, International Search Report dated Oct. 5, 2021", 3 pgs.

"International Application Serial No. PCT/US2021/038392, Written Opinion dated Oct. 5, 2021", 3 pgs.

"International Application Serial No. PCT/US2021/038401, International Search Report dated Sep. 17, 2021", 3 pgs.

"International Application Serial No. PCT/US2021/038401, Written Opinion dated Sep. 17, 2021", 4 pgs.

"International Application Serial No. PCT/US2021/038407, International Search Report dated Oct. 12, 2021", 4 pgs.

"International Application Serial No. PCT/US2021/038407, Written Opinion dated Oct. 12, 2021", 5 pgs.

"International Application Serial No. PCT/US2021/038413, International Search Report dated Oct. 5, 2021", 3 pgs.

"International Application Serial No. PCT/US2021/038413, Written Opinion dated Oct. 5, 2021", 4 pgs.

"U.S. Appl. No. 18/085,274, Non Final Office Action dated Sep. 13, 2023", 9 pages.

* cited by examiner

FLOW CONTROL FOR A MULTIPLE FLOW CONTROL UNIT INTERFACE

PRIORITY APPLICATION

This application is a continuation of U.S. application Ser. No. 17/007,468, filed Aug. 31, 2020, which is incorporated herein by reference in its entirety.

STATEMENT REGARDING GOVERNMENT SUPPORT

This invention was made with U.S. Government support under Agreement No. HR00111830003, awarded by DARPA. The U.S. Government has certain rights in the invention.

TECHNICAL FIELD

Embodiments of the disclosure relate generally to network protocols and more specifically to networking using a simplified flow control credit mechanism for packets with virtual channels on a multiple flow control unit ("flit") interface.

BACKGROUND

A packet is divided into flits for transmission over a bus by a transmitting device. Before transmitting the packet to a receiving device, the transmitting device verifies that sufficient credits are available for the receiving device to accept all of the flits of the packet. In many conventional systems, one credit is used for each flit. The first flit of a packet is a header flit that includes data used for routing over a network. The header flit is followed by zero or more body flits.

Chiplets are an emerging technique for integrating various processing functionality. Generally, a chiplet system is made up of discrete chips (e.g., integrated circuits (ICs) on different substrate or die) that are integrated on an interposer and packaged together. This arrangement is distinct from single chips (e.g., ICs) that contain distinct device blocks (e.g., intellectual property (IP) blocks) on one substrate (e.g., single die), such as a system-on-a-chip (SoC), or discreetly packaged devices integrated on a board. In general, chiplets provide better performance (e.g., lower power consumption, reduced latency, etc.) than discreetly packaged devices, and chiplets provide greater production benefits than single die chips. These production benefits can include higher yields or reduced development costs and time.

Chiplet systems are generally made up of one or more application chiplets and support chiplets. Here, the distinction between application and support chiplets is simply a reference to the likely design scenarios for the chiplet system. Thus, for example, a synthetic vision chiplet system can include an application chiplet to produce the synthetic vision output along with support chiplets, such as a memory controller chiplet, sensor interface chiplet, or communication chiplet. In a typical use case, the synthetic vision designer can design the application chiplet and source the support chiplets from other parties. Thus, the design expenditure (e.g., in terms of time or complexity) is reduced because by avoiding the design and production of functionality embodied in the support chiplets. Chiplets also support the tight integration of IP blocks that can otherwise be difficult, such as those using different feature sizes. Thus, for example, devices designed during a previous fabrication generation with larger feature sizes, or those devices in which the feature size is optimized for the power, speed, or heat generation—as can happen with sensors—can be integrated with devices having different feature sizes more easily than attempting to do so on a single die. Additionally, by reducing the overall size of the die, the yield for chiplets tends to be higher than that of more complex, single die devices.

In chiplet systems, communication between chiplets can include packet-based communication across a network or direct connection. In conventional systems, the efficiency of transfer and storage of such packet-based communications can affect the performance of the overall chiplet system.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1A:
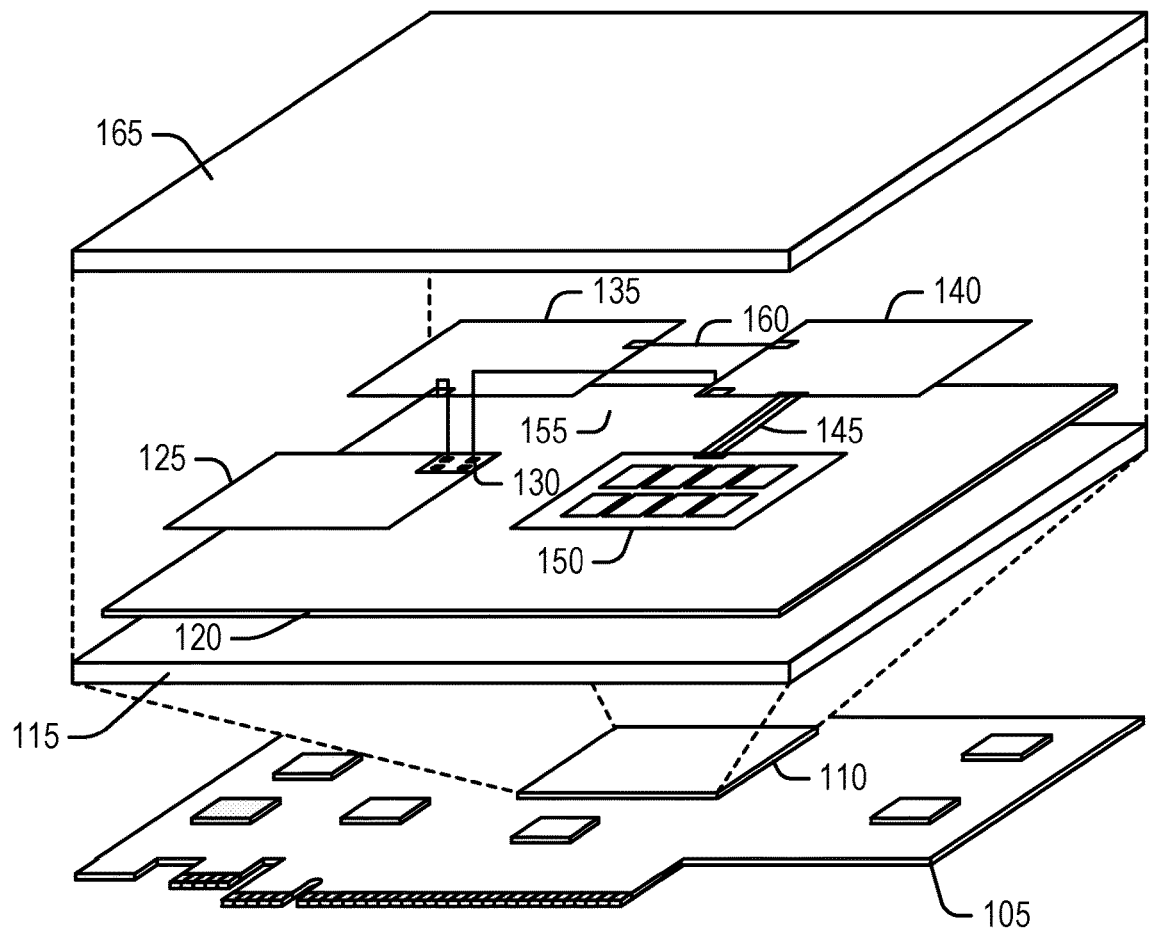
FIGS. 1A and 1B illustrate an example of a chiplet system, according to an embodiment.

Implementations of the present disclosure are directed to systems and methods for flow control using a multiple flit interface. A credit return field is used in a credit-based flow control system to indicate that one or more credits are being returned to a sending device from a receiving device. Based on the number of credits available, the sending device determines whether to send a packet to the receiving device or wait until more credits are returned. The credit return field may be a field in a data packet that carries other data (e.g., when two-way communications are used, such as in voice over Internet protocol (VoIP) applications) or may be in a separate data packet specifically sent for the purpose of returning credits. In a system using virtual channels, the credit-based flow control may track separate credit balances for each virtual channel of the destination.

In the example systems described herein, the amount of buffer space used by the receiver to store the packet is determined by the number of transfer cycles used to receive the packet, not the number of flits comprising the packet. This is enabled by having the buffer be as wide as the bus (e.g., if the bus receives three flits per transfer cycle, the buffer is three flits wide). The receiver returns credits to the sender based on the number of buffer rows used to store the received packet, not the number of flits comprising the packet. This reduces the computation on the receiver, since a lower number of rows is counted instead of a higher number of flits.

To support this credit flow system on the transmitter side, the number of credits consumed by sending a packet can be determined by the number of transfer cycles used to send the packet, not the number of flits comprising the packet.

Among the benefits of implementations of the present disclosure is that fewer data packets are used to return the lower number of credits representing the number of wide buffer entries consumed instead of the number of flits received. Also, by comparison with receiver devices that use a one-flit-wide buffer for a multiple-flit-wide bus, processing of data in the process of transferring the flits from the bus to the buffer is reduced. As a result, processing cycles expended in processing network traffic and returning credits are reduced. Additionally, power consumed in processing network traffic and returning credits are reduced. Performance of the system comprising the communicating devices is also improved as a result of the reduced networking overhead. Other benefits will be evident to those of skill in the relevant art having the benefit of this disclosure.

A particular environment in which the present implementations can be advantageous is in a chiplet system wherein one or more memory controller chiplets provide an interface between memory of the system and other chiplets, for example application chiplets, external interface chiplets, and the like. Processing intensive operations may require a relatively greater number of memory accesses through the memory controller, and/or a greater volume of data to be communicated through the memory controller. Accordingly, the described efficiencies in reducing processing cycles and power in the network performance improves communications with the memory controller and other chiplets, thereby improving overall system performance.

Figure 1B:
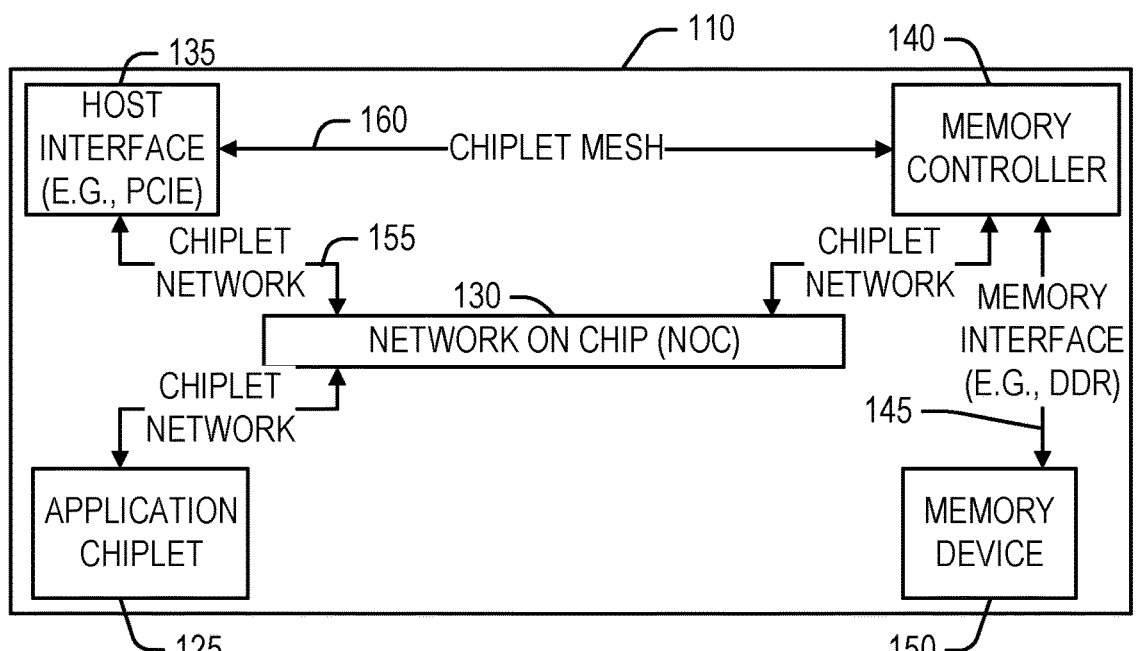

FIGS. 1A and 1B illustrate an example of a chiplet system 110, according to an embodiment. FIG. 1A is a representation of the chiplet system 110 mounted on a peripheral board 105, that can be connected to a broader computer system by a peripheral component interconnect express (PCIe), for example. The chiplet system 110 includes a package substrate 115, an interposer 120, and four chiplets, an application chiplet 125, a host interface chiplet 135, a memory controller chiplet 140, and a memory device chiplet 150. Other systems may include many additional chiplets to provide additional functionalities as will be apparent from the following discussion. The package of the chiplet system 110 is illustrated with a lid or cover 165, though other packaging techniques and structures for the chiplet system can be used. FIG. 1B is a block diagram labeling the components in the chiplet system for clarity.

The application chiplet 125 is illustrated as including a network-on-chip (NOC) 130 to support a chiplet network 155 for inter-chiplet communications. In example embodiments NOC 130 may be included on the application chiplet 125. In an example, NOC 130 may be defined in response to selected support chiplets (e.g., host interface chiplet 135, memory controller chiplet 140, and memory device chiplet 150) thus enabling a designer to select an appropriate number or chiplet network connections or switches for the NOC 130. In an example, the NOC 130 can be located on a separate chiplet, or even within the interposer 120. In examples as discussed herein, the NOC 130 implements a chiplet protocol interface (CPI) network.

The CPI is a packet-based network that supports virtual channels to enable a flexible and high-speed interaction between chiplets. CPI enables bridging from intra-chiplet networks to the chiplet network 155. For example, the Advanced eXtensible Interface (AXI) is a widely used specification to design intra-chip communications. AXI specifications, however, cover a great variety of physical design options, such as the number of physical channels, signal timing, power, etc. Within a single chip, these options are generally selected to meet design goals, such as power consumption, speed, etc. However, to achieve the flexibility of the chiplet system, an adapter, such as CPI, is used to interface between the various AXI design options that can be implemented in the various chiplets. By enabling a physical channel to virtual channel mapping and encapsulating time-based signaling with a packetized protocol, CPI bridges intra-chiplet networks across the chiplet network 155.

CPI can use a variety of different physical layers to transmit packets. The physical layer can include simple conductive connections, or can include drivers to increase the voltage, or otherwise facilitate transmitting the signals over longer distances. An example of one such physical layer can include the Advanced Interface Bus (AIB), which in various examples, can be implemented in the interposer 120. AIB transmits and receives data using source synchronous data transfers with a forwarded clock. Packets are transferred across the AIB at single data rate (SDR) or dual data rate (DDR) with respect to the transmitted clock. Various channel widths are supported by AIB. AIB channel widths are in multiples of 20 bits when operated in SDR mode (20, 40, 60, . . . ), and multiples of 40 bits for DDR mode: (40, 80, 120, . . . ). The AIB channel width includes both transmit and receive signals. The channel can be configured to have a symmetrical number of transmit (TX) and receive (RX) input/outputs (I/Os), or have a non-symmetrical number of transmitters and receivers (e.g., either all transmitters or all receivers). The channel can act as an AIB master or slave depending on which chiplet provides the master clock. AIB I/O cells support three clocking modes: asynchronous (i.e. non-clocked), SDR, and DDR. In various examples, the non-clocked mode is used for clocks and some control signals. The SDR mode can use dedicated SDR only I/O cells, or dual use SDR/DDR I/O cells.

In an example, CPI packet protocols (e.g., point-to-point or routable) can use symmetrical receive and transmit I/O cells within an AIB channel. The CPI streaming protocol allows more flexible use of the AIB I/O cells. In an example, an AIB channel for streaming mode can configure the I/O cells as all TX, all RX, or half RX and half RX. CPI packet protocols can use an AIB channel in either SDR or DDR operation modes. In an example, the AIB channel is configured in increments of 80 I/O cells (i.e. 40 TX and 40 RX) for SDR mode and 40 I/O cells for DDR mode. The CPI streaming protocol can use an AIB channel in either SDR or DDR operation modes. Here, in an example, the AIB channel is in increments of 40 I/O cells for both SDR and DDR modes. In an example, each AIB channel is assigned a unique interface identifier. The identifier is used during CPI reset and initialization to determine paired AIB channels across adjacent chiplets. In an example, the interface identifier is a 20-bit value comprising a seven-bit chiplet identifier, a seven-bit column identifier, and a six-bit link identifier. The AIB physical layer transmits the interface identifier using an AIB out-of-band shift register. The 20-bit interface identifier is transferred in both directions across an AIB interface using bits 32-51 of the shift registers.

AIB defines a stacked set of AIB channels as an AIB channel column. An AIB channel column has some number of AIB channels, plus an auxiliary channel. The auxiliary channel contains signals used for AIB initialization. All AIB channels (other than the auxiliary channel) within a column are of the same configuration (e.g., all TX, all RX, or half TX and half RX, as well as having the same number of data I/O signals). In an example, AIB channels are numbered in continuous increasing order starting with the AIB channel adjacent to the AUX channel. The AIB channel adjacent to the AUX is defined to be AIB channel zero.

Generally, CPI interfaces on individual chiplets can include serialization-deserialization (SERDES) hardware. SERDES interconnects work well for scenarios in which high-speed signaling with low signal count are desirable. SERDES, however, can result in additional power consumption and longer latencies for multiplexing and demultiplexing, error detection or correction (e.g., using block level cyclic redundancy checking (CRC)), link-level retry, or forward error correction. However, when low latency or energy consumption is a primary concern for ultra-short reach, chiplet-to-chiplet interconnects, a parallel interface with clock rates that allow data transfer with minimal latency may be utilized. CPI includes elements to reduce both latency and energy consumption in these ultra-short reach chiplet interconnects.

For flow control, CPI employs a credit-based technique. A recipient, such as the application chiplet 125, provides a sender, such as the memory controller chiplet 140, with credits that represent available buffers. In an example, a CPI recipient includes a buffer for each virtual channel for a given time-unit of transmission. Thus, if the CPI recipient supports five messages in time and a single virtual channel, the recipient has five buffers arranged in five rows (e.g., one row for each unit time). If four virtual channels are supported, then the recipient has twenty buffers arranged in five rows. Each buffer holds the payload of one CPI packet.

When the sender transmits to the recipient, the sender decrements the available credits based on the transmission. Once all credits for the recipient are consumed, the sender stops sending packets to the recipient. This ensures that the recipient has an available buffer to store the transmission.

As the recipient processes received packets and frees buffers, the recipient communicates the available buffer space back to the sender. This credit return can then be used by the sender allow transmitting of additional information.

Also illustrated is a chiplet mesh 160 that uses a direct, chiplet-to-chiplet technique without the need for the NOC 130. The chiplet mesh network 160 can be implemented in CPI, or another chiplet-to-chiplet protocol. The chiplet mesh network 160 generally enables a pipeline of chiplets where one chiplet serves as the interface to the pipeline while other chiplets in the pipeline interface only with themselves.

Additionally, dedicated device interfaces, such as one or more industry standard memory interfaces 145 (such as, for example, synchronous memory interfaces, such as DDR5, DDR 6), can also be used to interconnect chiplets. Connection of a chiplet system or individual chiplets to external devices (such as a larger system can be through a desired interface (for example, a PCIE interface). Such as external interface may be implemented, in an example, through a host interface chiplet 135, which in the depicted example, provides a PCIE interface external to chiplet system 110. Such dedicated interfaces 145 are generally employed when a convention or standard in the industry has converged on such an interface. The illustrated example of a Double Data Rate (DDR) interface 145 connecting the memory controller chiplet 140 to a dynamic random access memory (DRAM) memory device chiplet 150 is just such an industry convention.

Of the variety of possible support chiplets, the memory controller chiplet 140 is likely present in the chiplet system 110 due to the near omnipresent use of storage for computer processing as well as sophisticated state-of-the-art for memory devices. Thus, using memory device chiplets 150 and memory controller chiplets 140 produced by others gives chiplet system designers access to robust products by sophisticated producers. Generally, the memory controller chiplet 140 provides a memory device specific interface to read, write, or erase data. Often, the memory controller chiplet 140 can provide additional features, such as error detection, error correction, maintenance operations, or atomic operation execution. For some types of memory, maintenance operations tend to be specific to the memory device chiplet 150, such as garbage collection in NAND flash or storage class memories, temperature adjustments (e.g., cross temperature management) in NAND flash memories. In an example, the maintenance operations can include logical-to-physical (L2P) mapping or management to provide a level of indirection between the physical and logical representation of data. In other types of memory, for example DRAM, some memory operations, such as refresh may be controlled by a host processor or of a memory controller at some times, and at other times controlled by the DRAM memory device, or by logic associated with one or more DRAM devices, such as an interface chip (in an example, a buffer).

Atomic operations are a data manipulation that, for example, may be performed by the memory controller chiplet 140. In other chiplet systems, the atomic operations may be performed by other chiplets. For example, an atomic operation of "increment" can be specified in a command by the application chiplet 125, the command including a memory address and possibly an increment value. Upon receiving the command, the memory controller chiplet 140 retrieves a number from the specified memory address, increments the number by the amount specified in the command, and stores the result. Upon a successful completion, the memory controller chiplet 140 provides an indication of the commands success to the application chiplet 125. Atomic operations avoid transmitting the data across the chiplet network 160, resulting in lower latency execution of such commands.

Atomic operations can be classified as built-in atomics or programmable (e.g., custom) atomics. Built-in atomics are a finite set of operations that are immutably implemented in hardware. Programmable atomics are small programs that can run on a programmable atomic unit (PAU) (e.g., a custom atomic unit (CAU)) of the memory controller chiplet 140. FIG. 1 illustrates an example of a memory controller chiplet that discusses a PAU.

The memory device chiplet 150 can be, or include any combination of, volatile memory devices or non-volatile memories. Examples of volatile memory devices include, but are not limited to, random access memory (RAM)—such as DRAM) synchronous DRAM (SDRAM), graphics double data rate type 6 SDRAM (GDDR6 SDRAM), among others. Examples of non-volatile memory devices include, but are not limited to, negative-and-(NAND)-type flash memory, storage class memory (e.g., phase-change memory or memristor based technologies), ferroelectric RAM (FeRAM), among others. The illustrated example includes the memory device chiplet 150, however, the memory device chiplet 150 can reside elsewhere, such as in a different package on the board 105. For many applications, multiple memory device chiplets may be provided. In an example, these memory device chiplets may each implement one or multiple storage technologies. In an example, a memory chiplet may include, multiple stacked memory die of different technologies, for example one or more SRAM devices stacked or otherwise in communication with one or more DRAM devices. Memory controller chiplet 140 may also serve to coordinate operations between multiple memory chiplets in chiplet system 110; for example, to utilize one or more memory chiplets in one or more levels of cache storage, and to use one or more additional memory chiplets as main memory. Chiplet system 110 may also include multiple memory controller chiplets 140, as may be used to provide memory control functionality for separate processors, sensors, networks, etc. A chiplet architecture, such as chiplet system 110 offers advantages in allowing adaptation to different memory storage technologies; and different memory interfaces, through updated chiplet configurations, without requiring redesign of the remainder of the system structure.

Figure 2:
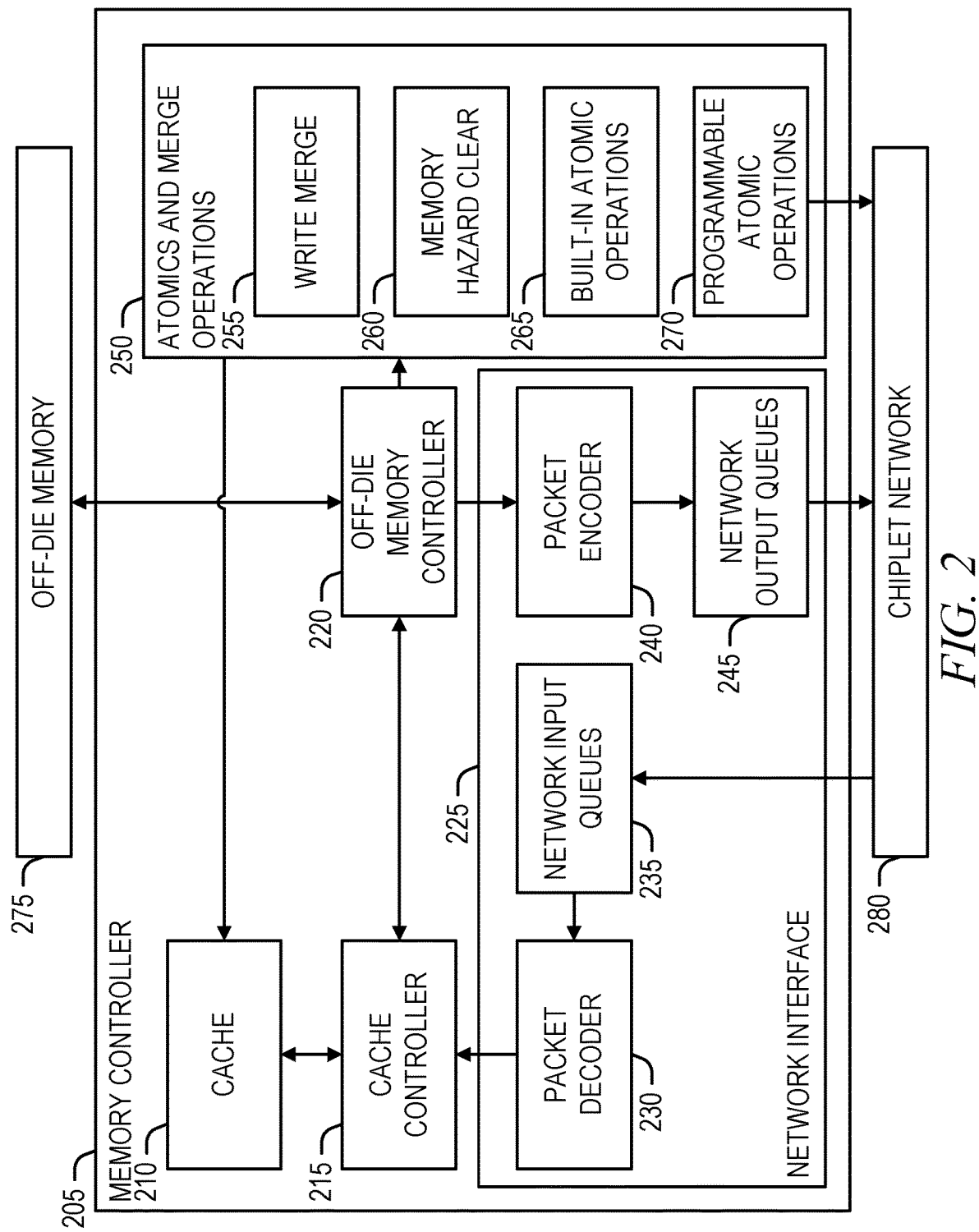
FIG. 2 illustrates components of an example of a memory controller chiplet, according to an embodiment.

FIG. 2 illustrates components of an example of a memory controller chiplet 205, according to an embodiment. The memory controller chiplet 205 includes a cache 210, a cache controller 215, an off-die memory controller 220 (e.g., to communicate with off-die memory 175), a network communication interface 225 (e.g., to interface with a chiplet network 180 and communicate with other chiplets), and a set of atomic and merge operations 250. Members of this set can include, for example, a write merge unit 255, a memory hazard clear unit 260, built-in atomic operations unit 265, or a PAU 270. The various components are illustrated logically, and not as they necessarily would be implemented. For example, the built-in atomic operations unit 265 likely comprises different devices along a path to the off-die memory. For example, the built-in atomic unit could be in an interface device/buffer on a memory chiplet, as discussed above. In contrast, the PAU 270 are likely implemented in a separate processor on the memory controller chiplet 205 (but in various examples may be implemented in other locations, for example on a memory chiplet).

The off-die memory controller 220 is directly coupled to the off-die memory 275 (e.g., via a bus or other communication connection) to provide write operations and read operations to and from the one or more off-die memory, such as off-die memory 275 and chiplet network 280. In the depicted example, the off-die memory controller 220 is also coupled for output to the atomic and merge operations 250, and for input to the cache controller 215 (e.g., a memory side cache controller).

In the example configuration, cache controller 215 is directly coupled to the cache 210, and may be coupled to the network communication interface 225 for input (such as incoming read or write requests), and coupled for output to the off-die memory controller 220.

The network communication interface 225 includes a packet decoder 230, network input queues 235, a packet encoder 240, and network output queues 245 to support a packet-based chiplet network 280, such as CPI. The chiplet network 280 can provide packet routing between and among processors, memory controllers, hybrid threading processors, configurable processing circuits, or communication interfaces. In such a packet-based communication system, each packet typically includes destination and source addressing, along with any data payload or instruction. In an example, the chiplet network 280 can be implemented as a collection of crossbar switches having a folded Clos configuration, or a mesh network providing for additional connections, depending upon the configuration.

In various examples, the chiplet network 280 can be part of an asynchronous switching fabric. Here, a data packet can be routed along any of various paths, such that the arrival of any selected data packet at an addressed destination can occur at any of multiple different times, depending upon the routing. Additionally, chiplet network 280 can be implemented at least in part as a synchronous communication network, such as a synchronous mesh communication network. Both configurations of communication networks are contemplated for use for examples in accordance with the present disclosure.

The memory controller chiplet 205 can receive a packet having, for example, a source address, a read request, and a physical address. In response, the off-die memory controller 220 or the cache controller 215 will read the data from the specified physical address (which can be in the off-die memory 275 or in the cache 210), and assemble a response packet to the source address containing the requested data. Similarly, the memory controller chiplet 205 can receive a packet having a source address, a write request, and a physical address. In response, the memory controller chiplet 205 will write the data to the specified physical address (which can be in the cache 210 or in the off-die memories 275 or 280), and assemble a response packet to the source address containing an acknowledgement that the data was stored to a memory.

Thus, the memory controller chiplet 205 can receive read and write requests via the chiplet network 280 and process the requests using the cache controller 215 interfacing with the cache 210, if possible. If the request cannot be handled by the cache controller 215, the off-die memory controller 220 handles the request by communication with the off-die memories 275 or 280, the atomic and merge operations 250, or both. As noted above, one or more levels of cache may also be implemented in off-die memories 275 or 280; and in some such examples may be accessed directly by cache controller 215. Data read by the off-die memory controller 220 can be cached in the cache 210 by the cache controller 215 for later use.

The atomic and merge operations 250 are coupled to receive (as input) the output of the off-die memory controller 220, and to provide output to the cache 210, the network communication interface 225, or directly to the chiplet network 280. The memory hazard clear unit 260, write merge unit 255 and the built-in atomic operations unit 265 can each be implemented as state machines with other combinational logic circuitry (such as adders, shifters, comparators, AND gates, OR gates, XOR gates, or any suitable combination thereof) or other logic circuitry. These components can also include one or more registers or buffers to store operand or other data. The PAU 270 can be implemented as one or more processor cores or control circuitry, and various state machines with other combinational logic circuitry or other logic circuitry, and can also include one or more registers, buffers, or memories to store addresses, executable instructions, operand and other data, or can be implemented as a processor.

The write merge unit 255 receives read data and request data, and merges the request data and read data to create a single unit having the read data and the source address to be used in the response or return data packet). The write merge unit 255 provides the merged data to the write port of the cache 210 (or, equivalently, to the cache controller 215 to write to the cache 210). Optionally, the write merge unit 255 provides the merged data to the network communication interface 225 to encode and prepare a response or return data packet for transmission on the chiplet network 280.

When the request data is for a built-in atomic operation, the built-in atomic operations unit 265 receives the request and reads data, either from the write merge unit 255 or directly from the off-die memory controller 220. The atomic operation is performed, and using the write merge unit 255, the resulting data is written to the cache 210, or provided to the network communication interface 225 to encode and prepare a response or return data packet for transmission on the chiplet network 280.

The built-in atomic operations unit 265 handles predefined atomic operations such as fetch-and-increment or compare-and-swap. In an example, these operations perform a simple read-modify-write operation to a single memory location of 32-bytes or less in size. Atomic memory operations are initiated from a request packet transmitted over the chiplet network 280. The request packet has a physical address, atomic operator type, operand size, and optionally up to 32-bytes of data. The atomic operation performs the read-modify-write to a cache memory line of the cache 210, filling the cache memory if necessary. The atomic operator response can be a simple completion response, or a response with up to 32-bytes of data. Example atomic memory operators include fetch-and-AND, fetch-and-OR, fetch-and-XOR, fetch-and-add, fetch-and-subtract, fetch-and-increment, fetch-and-decrement, fetch-and-minimum, fetch-and-maximum, fetch-and-swap, and compare-and-swap. In various example embodiments, 32-bit and 64-bit operations are supported, along with operations on 16 or 32 bytes of data. Methods disclosed herein are also compatible with hardware supporting larger or smaller operations and more or less data.

Built-in atomic operations can also involve requests for a "standard" atomic operation on the requested data, such as comparatively simple, single cycle, integer atomics—such as fetch-and-increment or compare-and-swap—which will occur with the same throughput as a regular memory read or write operation not involving an atomic operation. For these operations, the cache controller 215 may generally reserve a cache line in the cache 210 by setting a hazard bit (in hardware), so that the cache line cannot be read by another process while it is in transition. The data is obtained from either the off-die memory 275 or the cache 210, and is provided to the built-in atomic operations unit 265 to perform the requested atomic operation. Following the atomic operation, in addition to providing the resulting data to the data packet encoder 240 to encode outgoing data packets for transmission on the chiplet network 280, the built-in atomic operations unit 265 provides the resulting data to the write merge unit 255, which will also write the resulting data to the cache 210. Following the writing of the resulting data to the cache 210, any corresponding hazard bit which was set will be cleared by the memory hazard clear unit 260.

The PAU 270 enables high performance (high throughput and low latency) for programmable atomic operations (also referred to as "custom atomic operations"), comparable to the performance of built-in atomic operations. Rather than executing multiple memory accesses, in response to an atomic operation request designating a programmable atomic operation and a memory address, circuitry in the memory controller chiplet 205 transfers the atomic operation request to PAU 270 and sets a hazard bit stored in a memory hazard register corresponding to the memory address of the memory line used in the atomic operation, to ensure that no other operation (read, write, or atomic) is performed on that memory line, which hazard bit is then cleared upon completion of the atomic operation. Additional, direct data paths provided for the PAU 270 executing the programmable atomic operations allow for additional write operations without any limitations imposed by the bandwidth of the communication networks and without increasing any congestion of the communication networks.

The PAU 270 includes a multi-threaded processor, for example, such as a RISC-V ISA based multi-threaded processor, having one or more processor cores, and further having an extended instruction set for executing programmable atomic operations. When provided with the extended instruction set for executing programmable atomic operations, the PAU 270 can be embodied as one or more hybrid threading processors. In some example embodiments, the PAU 270 provides barrel-style, round-robin instantaneous thread switching to maintain a high instruction-per-clock rate.

Programmable atomic operations can be performed by the PAU 270 involving requests for a programmable atomic operation on the requested data. A user can prepare programming code to provide such programmable atomic operations. For example, the programmable atomic operations can be comparatively simple, multi-cycle operations such as floating-point addition, or comparatively complex, multi-instruction operations such as a Bloom filter insert. The programmable atomic operations can be the same as or different than the predetermined atomic operations, insofar as they are defined by the user rather than a system vendor. For these operations, the cache controller 215 can reserve a cache line in the cache 210, by setting a hazard bit (in hardware), so that cache line cannot be read by another process while it is in transition. The data is obtained from either the cache 210 or the off-die memories 275 or 280, and is provided to the PAU 270 to perform the requested programmable atomic operation. Following the atomic operation, the PAU 270 will provide the resulting data to the network communication interface 225 to directly encode outgoing data packets having the resulting data for transmission on the chiplet network 280. In addition, the PAU 270 will provide the resulting data to the cache controller 215, which will also write the resulting data to the cache 210. Following the writing of the resulting data to the cache 210, any corresponding hazard bit which was set will be cleared by the cache controller 215.

In selected examples, the approach taken for programmable atomic operations is to provide multiple, generic, custom atomic request types that can be sent through the chiplet network 280 to the memory controller chiplet 205 from an originating source such as a processor or other system component. The cache controller 215 or off-die memory controller 220 identify the request as a custom atomic and forward the request to the PAU 70. In a representative embodiment, the PAU 270: (1) is a programmable processing element capable of efficiently performing a user defined atomic operation; (2) can perform load and stores to memory, arithmetic and logical operations and control flow decisions; and (3) leverages the RISC-V ISA with a set of new, specialized instructions to facilitate interacting with such cache controller 215 and off-die memory controller 220 to atomically perform the user-defined operation. In desirable examples, the RISC-V ISA contains a full set of instructions that support high level language operators and data types. The PAU 270 can leverage the RISC-V ISA, but will commonly support a more limited set of instructions and limited register file size to reduce the die size of the unit when included within the memory controller chiplet 205.

As mentioned above, prior to the writing of the read data to the cache 210, the set hazard bit for the reserved cache line is to be cleared, by the memory hazard clear unit 260. Accordingly, when the request and read data is received by the write merge unit 255, a reset or clear signal can be transmitted by the memory hazard clear unit 260 to the cache 210 to reset the set memory hazard bit for the reserved cache line. Also, resetting this hazard bit will also release a pending read or write request involving the designated (or reserved) cache line, providing the pending read or write request to an inbound request multiplexer for selection and processing.

Figure 3:
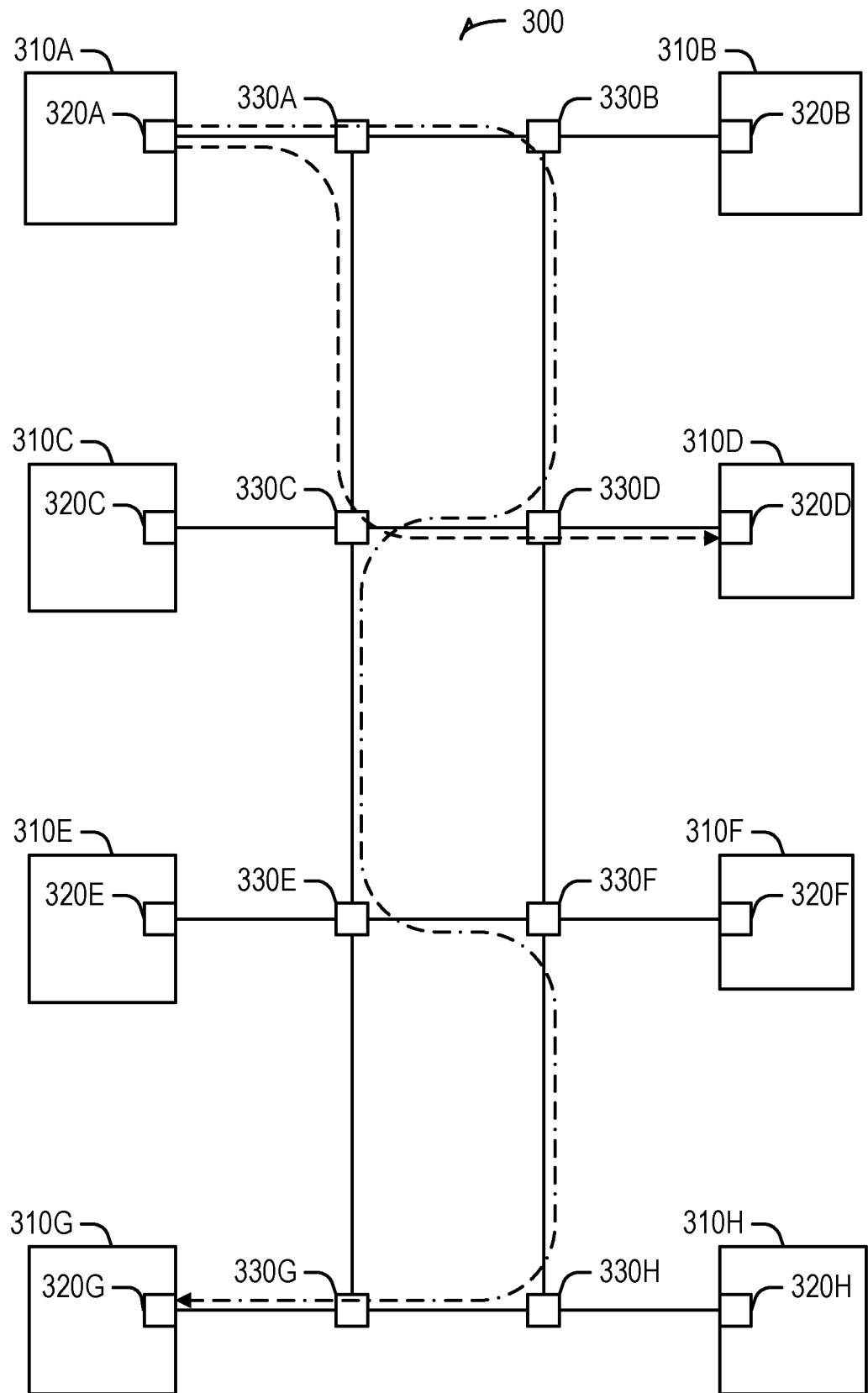
FIG. 3 illustrates an example of routing between chiplets in a chiplet layout using a chiplet protocol interface (CPI) network, according to an embodiment.

FIG. 3 illustrates an example of routing between chiplets in a chiplet layout 300 using a chiplet protocol interface (CPI) network, according to an embodiment. The chiplet layout 300 includes chiplets 310A, 310B, 310C, 310D, 310E, 310F, 310G, and 310H. The chiplets 310A-310H are interconnected by a network comprising nodes 330A, 330B, 330C, 330D, 330E, 330F, 330G, and 330H. Each of the chiplets 310A-310H includes a hardware transceiver, labeled 320A-320H.

CPI packets can be transferred between the chiplets 310 using an Advanced Interface Bus (AIB). The AIB provides physical layer functionality. The physical layer transmits and receives data using source synchronous data transfers with a forwarded clock. Packets are transferred across the AIB at single data rate (SDR) or dual data rate (DDR) with respect to the transmitted clock. Various channel widths are supported by the AIB. AIB channel widths are in multiples of 20 bits when operated in SDR mode (20, 40, 60, . . . ), and 40 bits for DDR mode: (40, 80, 120, . . . ). The AIB channel width includes both transmit and receive signals. The channel may be configured to have a symmetrical number of transmit (TX) and receive (RX) input/outputs (I/Os), or have a non-symmetrical number of transmitters and receivers (e.g., either all transmitters or all receivers). The channel may act as an AIB master or slave depending on which chiplet provides the master clock.

The AIB adapter provides an interface to the AIB link layer and an interface to the AIB physical layer (PHY). The AIB adapter provides data staging registers, power-on reset sequencers, and a control signal shift register.

The AIB physical layer consists of AIB I/O Cells. AIB I/O cells (implemented, in some example embodiments, by the hardware transceivers 320) may be input only, output only or bidirectional. An AIB channel is composed of a set of AIB I/O cells, the number of cells is dependent on the configuration of the AIB channel. The receive signals on one chiplet are connected to the transmit signals on the paired chiplet. In some example embodiments, each column comprises an auxiliary (AUX) channel and data channels numbered 0 to N.

AIB channels are typically configured as half TX data plus half RX data, all TX data, or all RX data plus associated clocks and miscellaneous control. The number of TX versus RX data signals is determined at design time and cannot be configured as part of system initialization, in some example embodiments.

The CPI packet protocols (point-to-point and routable) use symmetrical receive and transmit I/O cells within an AIB channel. The CPI streaming protocol allows more flexible use of the AIB I/O cells. An AIB channel for streaming mode may configure the I/O cells as all TX, all RX, or half RX and half RX, in some example embodiments.

Data packets are routed among the chiplets 310 by the network nodes 330. A node 330 may determine the next node 330 to forward a received data packet to based on one or more data fields of the data packet. For example, a source or destination address, source or destination port, virtual channel, or any suitable combination thereof may be hashed to select a successive network node or an available network path. Selecting paths in this way may serve to balance network traffic.

Thus, in FIG. 3, a data path is shown from the chiplet 310A to the chiplet 310D. The data packet is sent by the hardware transceiver 320A to the network node 330A; forwarded by the network node 330A to the network node 330C; forwarded by the network node 330C to the network node 330D; and delivered by the network node 330D to the hardware transceiver 320D of the chiplet 310D.

A second data path is also shown in FIG. 3, from the chiplet 310A to the chiplet 310G. The data packet is sent by the hardware transceiver 320A to the network node 330A; forwarded by the network node 330A to the network node 330B; forwarded by the network node 330B to the network node 330D; forwarded by the network node 330D to the network node 330C; forwarded by the network node 330C to the network node 330E; forwarded by the network node 330E to the network node 330F; forwarded by the network node 330F to the network node 330H; forwarded by the network node 330H to the network node 330G; and delivered by the network node 330G to the hardware transceiver 320G of the chiplet 310G. As is visually apparent in FIG. 3, multiple paths through the network are available for transmission of data between any pair of chiplets.

AIB I/O cells support three clocking modes: asynchronous (i.e. non-clocked), SDR, and DDR. The non-clocked mode is used for clocks and some control signals. The SDR mode may use dedicated SDR only I/O cells, or dual use SDR/DDR I/O cells.

CPI packet protocols (point-to-point and routable) may use an AIB channel in either SDR or DDR operation modes. In some example embodiments, the AIB channel shall be is in increments of 80 I/O cells (i.e. 40 TX and 40 RX) for SDR mode and 40 I/O cells for DDR mode.

CPI streaming protocol may use an AIB channel in either SDR or DDR operation modes. In some example embodiments, for both modes (SDR and DDR) the AIB channel is in increments of 40 I/O cells.

Each AIB channel is assigned a unique interface identifier. The identifier is used during CPI reset and initialization to determine paired AIB channels across adjacent chiplets. In some example embodiments, the interface identifier is a 20-bit value comprising a seven-bit chiplet identifier, a seven-bit column identifier, and a six-bit link identifier. The AIB physical layer transmits the interface identifier using an AIB out-of-band shift register. The 20-bit interface identifier is transferred in both directions across an AIB interface using bits 32-51 of the shift registers.

AIB defines a stacked set of AIB channels as an AIB channel column. As shown in FIG. 3, an AIB channel column has some number of AIB channels, plus an auxiliary channel. The auxiliary channel contains signals used for AIB initialization. All AIB channels (other than the auxiliary channel) within a column are of the same configuration (e.g., all TX, all RX, or half TX and half RX, as well as having the same number of data I/O signals). The AIB channel columns are arranged around the periphery of a chiplet in a specific orientation to allow interoperability between chiplets. Though each of the chiplets 310 is shown in FIG. 3 with one hardware transceiver 320, note that each side of a chiplet may have zero or more hardware transceivers.

In some example embodiments, AIB channels are numbered in continuous increasing order starting with the AIB channel adjacent to the AUX channel. The AIB channel adjacent to the AUX is defined to be AIB channel zero.

FIG. 3, by way of example, shows eight chiplets 310 connected by a network comprising eight nodes 330. More or fewer chiplets 310 and more or fewer nodes 330 may be included in the chiplet network, allowing a network of chiplets of arbitrary size to be created.

Figure 4:
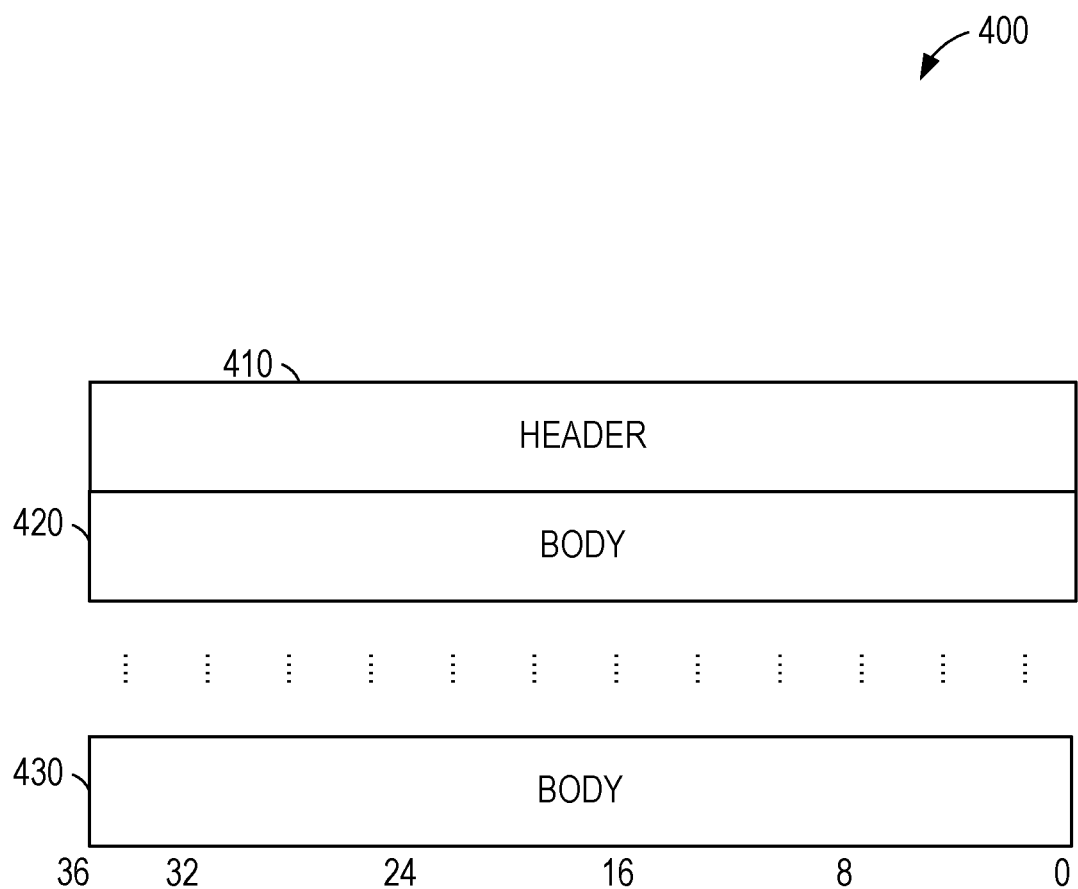
FIG. 4 is a block diagram of a data packet comprising multiple flits, in accordance with some embodiments of the present disclosure.

FIG. 4 is a block diagram of a data packet 400 comprising multiple flits, in accordance with some embodiments of the present disclosure. The data packet 400 is suitable for use by the memory controller chiplet 205 of FIG. 2 in communication with other chiplets over the network 300 of FIG. 3. The data packet 400 is divided into flow control units (flits), each of which, in the present example is composed of 36 bits. The data packet 400 includes a header 410 and zero or more body flits (e.g., body flit 420 and body flit 430). The header 410 may include a destination identifier field, a length field, a command field, or any suitable combination thereof. The body flit 420 and body flit 430 may include data, additional control fields, or both.

The destination identifier uniquely identifies a destination in the network (e.g., a virtual channel on a physical destination chiplet). In direct-wired connections that do not use a network with multiple destinations, the destination identifier may be omitted. The length field indicates the number of flits that comprise the data packet 400. Interpretation of the length field may be non-linear. For example, values 0-22 may be interpreted as 0-22 flits in the data packet 400 and values 23-27 may be interpreted as 33-37 flits in the data packet 400 (i.e., 10 more than the indicated value). In this example, the size of the packet is measured in flits, irrespective of the width of the bus or the number of bits per flit. In other example embodiments, the size of the packet is measured in bits or bytes. In still other example embodiments, the size of the packet is fixed and the length field may be omitted. Other values of the body flit 430 may be vendor defined instead of protocol defined.

The command for the data packet 400 may be, for example, a write command, a read command, a predefined atomic operation command, a custom atomic operation command, a read response, an acknowledge response, or a vendor-specific command. Additionally, the command may indicate a virtual channel of the data packet 400. For example, different commands may be used for different virtual channels.

The memory access commands may further identify a number of bytes to be written or accessed, a memory space to access (e.g., the off-die memory 375 or an instruction memory for custom atomic operations), or any suitable combination thereof. In some example embodiments, the command may indicate that additional bits of a later flit identify the command. For example, a multi-byte command could be sent by using a vendor-specific command in the command field of the header 410 and using a portion or all of the body flit 420 to contain the larger command.

Figure 5:
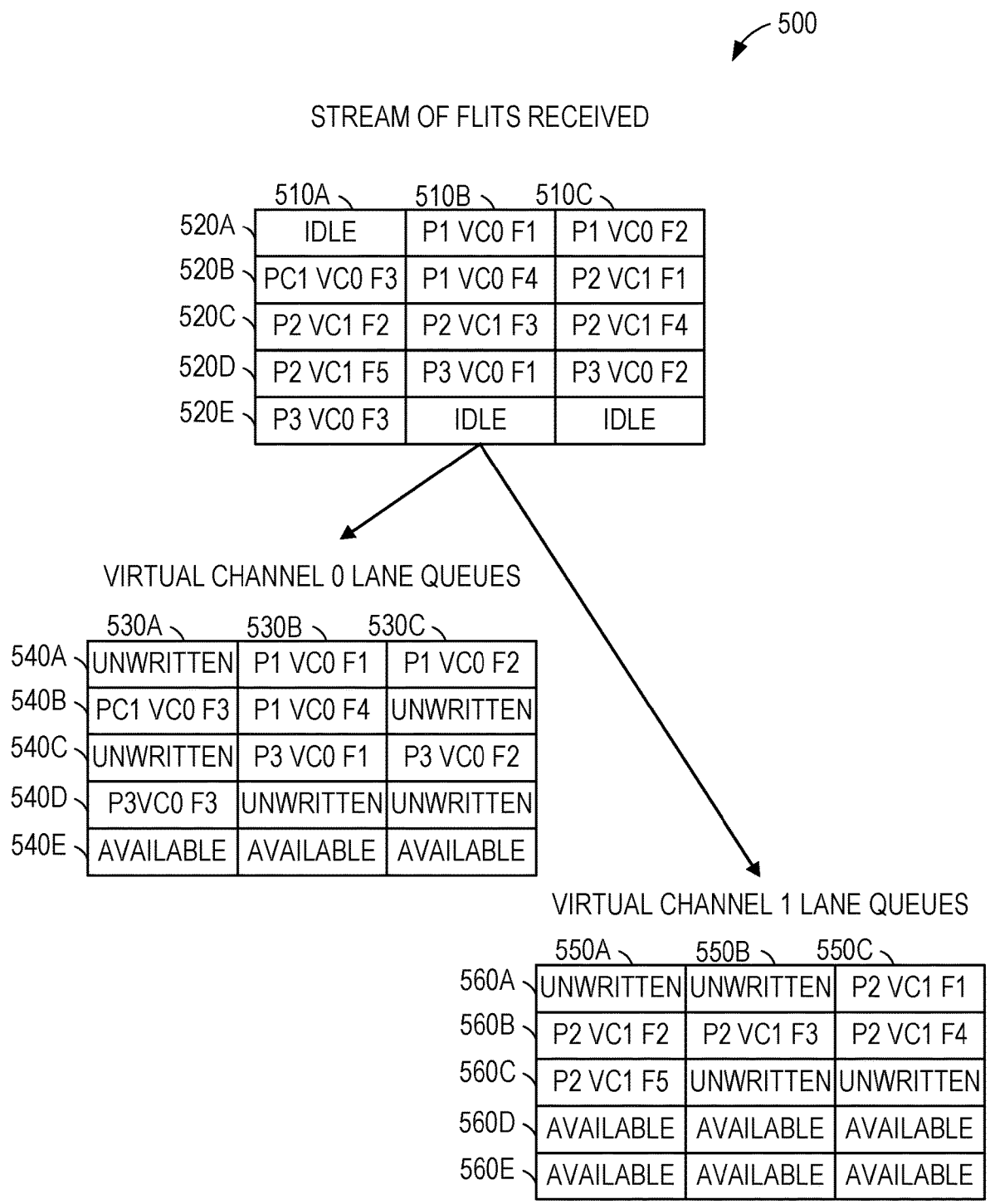
FIG. 5 is a block diagram showing a stream of flits received and virtual channel queues of the received flits, in accordance with some embodiments of the present disclosure.

FIG. 5 is a block diagram 500 showing a stream of flits received and virtual channel queues of the received flits, in accordance with some embodiments of the present disclosure. The interface on which the stream of flits is received is three lanes wide. Thus, one flit is received simultaneously on each of lanes 510A, 510B, and 510C. The received flits are shown sequentially in rows 520A, 520B, 520C, 520D, and 520E. After receipt, the flits are stored in either the virtual channel 0 lane queues 530A, 530B, and 530C or the virtual channel 1 lane queues 550A, 550B, and 550C. The virtual channel 0 lane queues 530A-530C store flits in rows 540A, 540B, 540C, 540D, and 540E. The virtual channel 1 lane queues 550A-550C store flits in rows 560A, 560B, 560C, 560D, and 560E.

The stream of flits received shows three packets: P1, P2, and P3. P1 is destined for virtual channel 0 and comprises four flits. P2 is destined for virtual channel 1 and comprises five flits. P3 is destined for virtual channel 0 and comprises 3 flits. The virtual channel for each packet may be determined based on the destination identifier in the header 410.

On each clock cycle, the entire row of received data (e.g., one of the rows 520A-520E) is wholly or partially copied to zero or more of the virtual channel lane queues based on the destination of the flits in the row. For example, the row 520A is partially copied to the row 540A because the two flits in the row 520A are destined for virtual channel 0. The data in the idle flit of the row 520A may be copied or left unwritten in the row 540A. As another example, the row 520B is partially copied to both the row 540B and the row 560A because the row 520B contains at least one flit for both the virtual channel 0 and the virtual channel 1.

The rows 540E, 560D, and 560E are available to store additional data. In some example embodiments, data is cleared (e.g., replaced with 0s or another data pattern) after the buffered data is read.

By copying the entire row into a queue with multiple lanes instead of copying each flit individually into a single-lane queue, timing of the circuit design is easier to meet. For example, with respect to the row 520A, the first flit of P1 would be copied into a first entry of a single-lane queue, a destination pointer would be incremented, and then the second flit of P1 would be copied into a second entry of the single-lane queue. Each of these operations would need to complete before the next clock cycle of the bus on which the stream of flits is being received, using a higher internal clock rate.

In credit-based flow control systems, a transmitting device maintains a data structure indicating a number of credits available for transmission of data to a destination. The initial number of credits may be provided from the destination to the source (e.g., at powerup). As can be seen in the example of FIG. 5, the receiving device has five entries of buffer space available for each virtual channel. Thus, if the device is communicating with only a single transmitter, five credits for each virtual channel can be safely allocated. Upon transmission, the transmitting device reduces the number of available credits for the virtual channel used. After the data is processed, the receiving device sends one or more credit return packets. The credit return packets indicate the amount of buffer space that has been freed by the processing of the data and is now available to store additional data from the source. In this way, the source is able to track the amount of available buffer space at the destination and avoid overflow.

Figure 6:
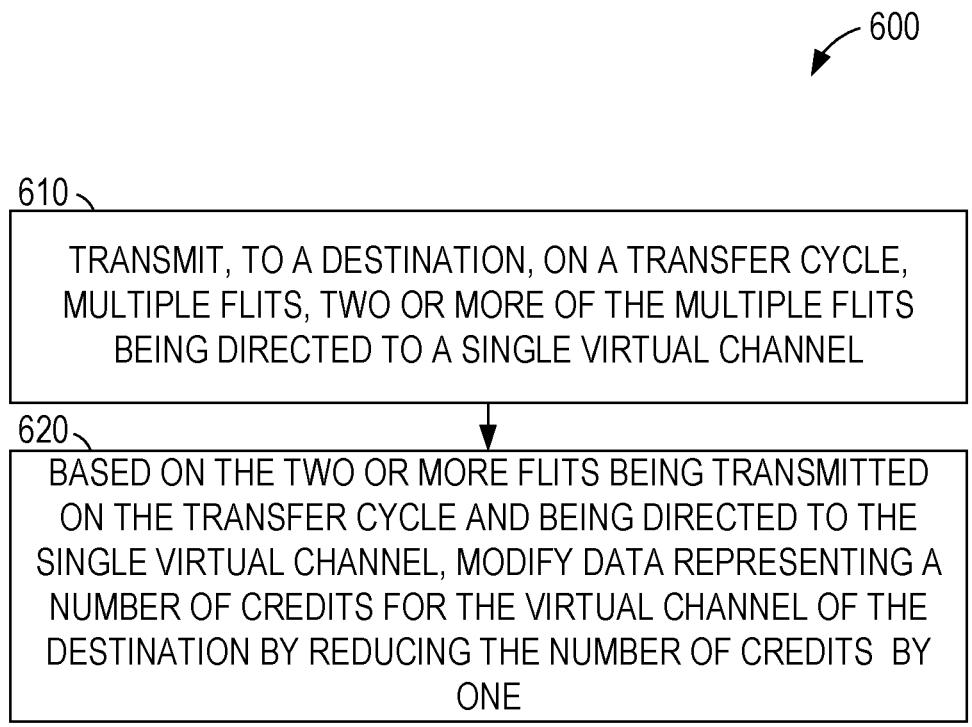
FIG. 6 is a flow chart showing operations of a method performed by a circuit in sending multiple flits on a transfer cycle, in accordance with some embodiments of the present disclosure.

FIG. 6 is a flow chart showing operations of a method 600 performed by a circuit (e.g., the chiplet 205 of FIG. 2) in sending multiple flits on a transfer cycle, in accordance with some embodiments of the present disclosure. The method 600 includes operations 610, and 620. By way of example and not limitation, the method 600 is described as being performed by the devices of FIGS. 1-3, using the data packet of FIG. 4. In the method 600, transmission of a packet is associated with credits such that any number of flits transmitted in a single transfer cycle are associated with a single credit.

In operation 610, logic (e.g., one or more components of the chiplet 310A, such as the network interface 225) transmits, to a destination (e.g., the chiplet 310D), on a transfer cycle, multiple of flits, two or more of the multiple flits being directed to a single virtual channel. For example, the flits of any of the rows 520A-520D may be sent. The rows 520A, 520B, and 520D include two or more flits directed to the virtual channel 0; the row 520C includes two or more flits directed to the virtual channel 1. Each flit may include an indicator of the virtual channel for which they are destined. Alternatively, a header 410 may include an indicator of the virtual channel for the entire packet and the number of flits in the packet (or other measure of packet size). Based on the packet size and the identified virtual channel in the header, the circuit determines that each flit in the packet is also for the same virtual channel.

The logic (e.g., one or more components of the chiplet 310A), in operation 620, based on the two or more flits being transmitted on the transfer cycle and being directed to the single virtual channel, modifies data representing a number of credits for the virtual channel of the destination by reducing the number of credits by one. Thus, for the row 520A, the number of credits for virtual channel 0 is reduced by one, even though more than one flit was sent for virtual channel 0. In some example embodiments, the number of credits for each virtual channel that has one or more flits sent in the transfer cycle is reduced by one. In these example embodiments, the chiplet 310A reduces the number of credits for both virtual channel 0 and virtual channel 1 after sending the flits of the row 520A.

By contrast with solutions that use one credit to represent one flit, fewer credits are required to send a data packet over a multiple flit interface using transfer cycle-based credits instead of flit-based credits.

Figure 7:
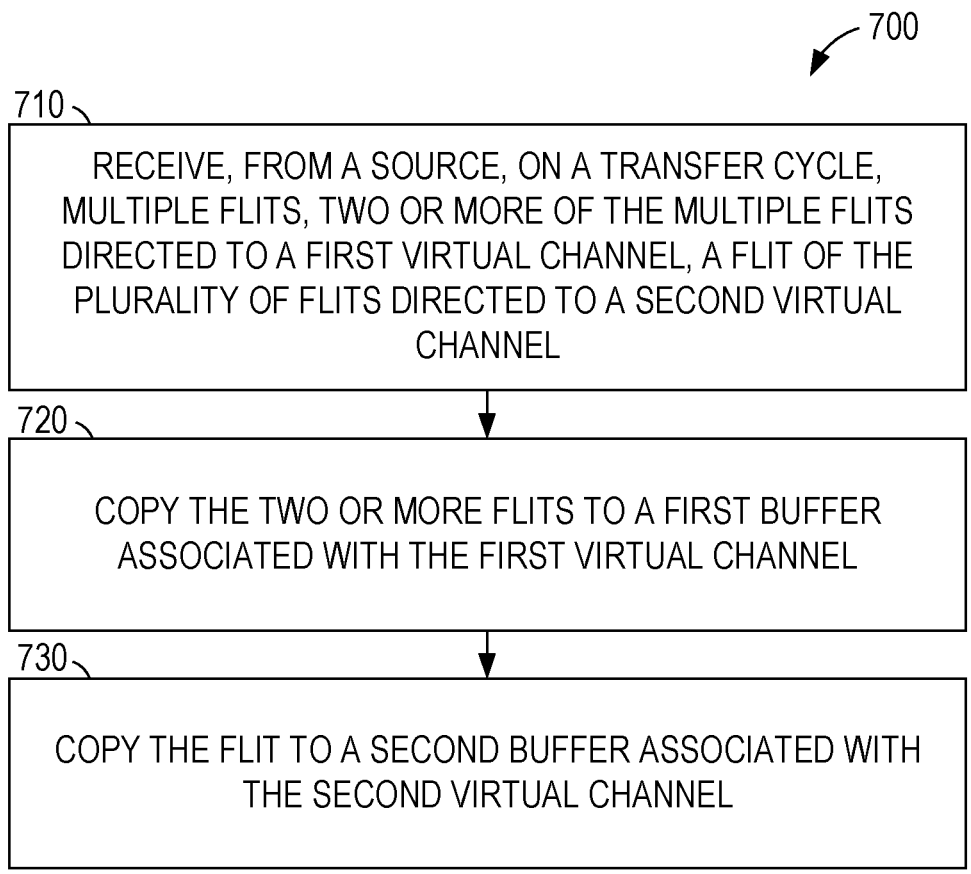
FIG. 7 is a flow chart showing operations of a method performed by a circuit in receiving multiple flits on a transfer cycle, in accordance with some embodiments of the present disclosure.

FIG. 7 is a flow chart showing operations of a method 700 performed by a circuit in receiving multiple flits on a transfer cycle, in accordance with some embodiments of the present disclosure. The method 700 includes operations 710, 720, and 730. By way of example and not limitation, the method 700 is described as being performed by the devices of FIGS. 1-3, using the data packet of FIG. 4.

In operation 710, a circuit receives, from a source, on a transfer cycle, multiple flits, two or more of the multiple flits directed to a first virtual channel, a flit of the plurality of flits directed to a second virtual channel. For example, the network interface 225 of the chiplet 310D may receive, from the chiplet 310A, on a transfer cycle, the flits of the row 520B, comprising two flits directed to virtual channel 0 and one flit directed to virtual channel 1. In some example embodiments, each flit includes an indicator of the virtual channel that it is directed to. In other example embodiments, a header flit of a packet indicates the virtual channel and the size of the packet; following flits are determined to be part of the packet based on the size of the packet and thus are determined to be directed to the virtual channel indicated in the header.

The circuit, in operation 720, copies the two or more flits to a first buffer associated with the first virtual channel. For example, the flits directed to virtual channel 0 of the row 520B are copied to two of the lane queues for virtual channel 0 in the row 540B.

In operation 730, the circuit copies the flit to a second buffer associated with the second virtual channel. Continuing with this example, the flit for virtual channel 1 of the row 520B is copied to the lane queue 550C for virtual channel 1 in the row 560A. Operations 720 and 730 may be performed on a single clock cycle, simultaneously, or both.

By contrast with solutions that use a single lane queue for each virtual channel, a circuit using the method 700 is enabled to copy all data for a virtual channel without incurring the delay of a copy, increment pointer, copy cycle. Additionally, by masking the data in the stream of flits received so that data for a virtual channel is not written to the lane queues of other virtual channels (as shown by the "UNWRITTEN" values in the rows 540A, 540D, 560A, and 560C) energy consumption is reduced.

Figure 8:
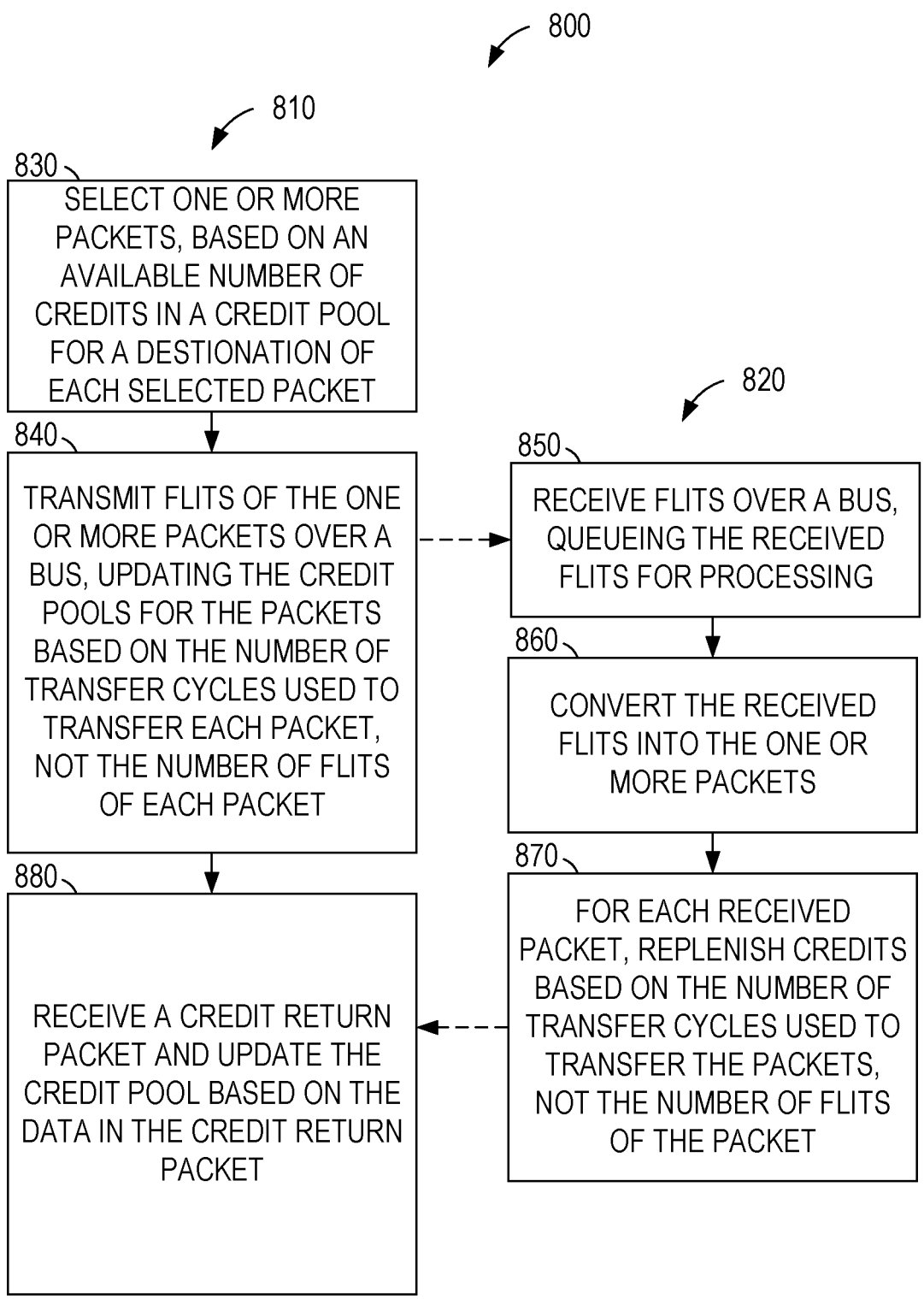
FIG. 8 is a compound flow chart showing operations of a compound method performed by a first circuit and second circuit, the first method performed by the first circuit in sending one or more packets and the second method performed by the second circuit in receiving the one or more packets, in accordance with some embodiments of the present disclosure.

FIG. 8 is a compound flow chart showing operations of a compound method 800 performed by a first circuit and second circuit, including a first method 810 performed by the first circuit in sending one or more packets and a second method 820 performed by the second circuit in receiving the one or more packets, in accordance with some embodiments of the present disclosure. The method 810 includes operations 830, 840, and 880. The method 820 includes operations 850, 860, and 870. Solid arrows indicate a sequence of operations within each method 810 and 820. Dashed arrows show the relationships between the two methods 810 and 820. The compound method 800, taken as a whole, includes the operations 830-880. By way of example and not limitation, the method 800 is described as being performed by the devices of FIGS. 1-3, using the data packet of FIG. 4.

In operation 830, a source (e.g., the chiplet 310A) selects one or more packets based on an available number of credits in a credit pool for a destination of each selected packet. For example, a number of packets may be queued for transmission from the source. Each packet identifies a destination (e.g., a physical device and a virtual channel) for the packet. Each packet also has a size (e.g., a number of flits that will be used to transfer the packet). Based on the size of the packet and the number of available credits for the destination, the source determines whether sufficient credits are available to transfer the entire packet. In a flit-based flow control credit scheme, the number of credits used to transfer the packet is the number of flits in the packet. In a transfer cycle-based flow control scheme, the number of credits used to transfer the packet is the number of transfer cycles used to transfer the packet. This may be determined by using the equation below:

$$\text{cycles} = \text{ceiling}\left(\frac{f_0 + \text{size}}{\text{width}}\right)$$

In this equation, cycles is the number of transfer cycles it will take to transfer the packet, ceiling is a function that rounds fractional values up to the next integer, $f_0$ is the 0-based offset of the position of the first flit in the wide bus, and width is the width of the bus, measured in flits. Thus, when width=1, $f_0$ is always 0, and the number of cycles is simply the size of the packet in flits. When width=2 and $f_0$ is 0, the number of cycles is half the size of the packet, rounded up. When width=2 and $f_0$ is 1, a packet with an even number of flits takes an additional transfer cycle to transmit (due to transmitting only one flit on the first transfer cycle and one flit on the last transfer cycle).

The source, in operation 840, transmits flits of the one or more packets over a bus, updating the credit pools for the packets based on the number of transfer cycles used to transfer each packet, not the number of flits of each packet. With reference to the stream of flits of FIG. 5, three packets are sent: P1, P2, and P3. P1, though four flits long, consumes two credits, since the entire packet was transmitted in two transfer cycles corresponding to the rows 520A and 520B. P2, though five flits long, consumes three credits. P3, though three flits long, consumes two credits. Thus, on a transfer cycle in which flits of for multiple destinations are sent, the number of available credits for each destination is reduced by one, regardless of the distribution of the flits among the destinations. In some example embodiments, the credit pool is updated before any flits of the packet are sent, reducing the number of credits available by the number of transfer cycles that will be used sending the packet. In other example embodiments, the credit pool is updated on each transfer cycle, decrementing the available credits by one each time one or more flits are transferred.

In operation 850, the destination receives the flits over a bus, queueing the received flits for processing. Continuing with the example of FIG. 5, the receiving chiplet 310D stores the flits in virtual channel lane queues based on a virtual channel identified in the header of each packet.

The destination circuit, in operation 860, converts the received flits into the one or more packets. Thus, the packets P1, P2, and P3 are recreated from the received flits.

In operation 870, for each received packet, the destination circuit replenishes credits based on the number of transfer cycles used to transfer the packets, not the number of flits of the packet. For example, a credit return packet may be sent from the chiplet 310D to the chiplet 310A, indicating that two credits are returned after P1 is processed, that three credits are returned after P2 is processed, or that two credits are returned after P3 is processed. After processing the packet, the rows storing the flits comprising the packet are available to handle new data received over the bus.

The source circuit, in operation 880, receives the credit return packet and updates the credit pool based on the data in the credit return packet. For example, the credit return packet may indicate the destination circuit (using an identifier of the chiplet 310D) and the virtual channel as well as the number of credits being returned. By updating the credit pool to reflect the freed rows at the destination, the source circuit is prepared for another iteration of the method 800, sending more data packets to the destination without overflowing the receiving buffers.

A system comprising both the source and destination chiplets performs the method 800, comprising the coordinated methods 810 and 820. Through the use of the method 800, the system is enabled to use credit-based flow control that prevents overflow of destination buffers, to take advantage of a wide bus's ability to transfer multiple flits per transfer cycle, and to avoid complications that arise from using single-lane buffers with a wide bus.

Figure 9:
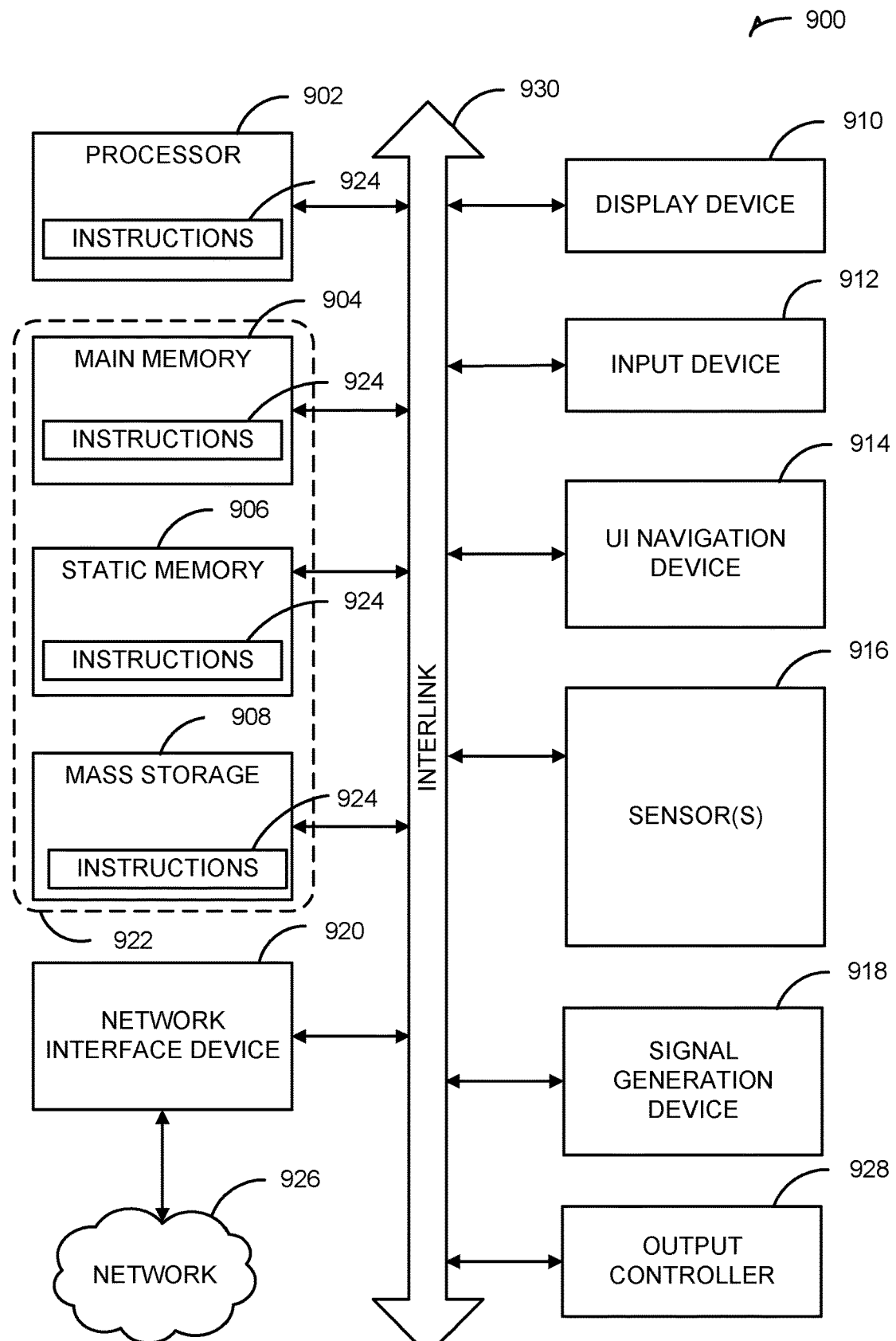
FIG. 9 is a block diagram of an example computer system in which embodiments of the present disclosure may operate.

FIG. 9 illustrates a block diagram of an example machine 900 with which, in which, or by which any one or more of the techniques (e.g., methodologies) discussed herein can be implemented. Examples, as described herein, can include, or can operate by, logic or a number of components, or mechanisms in the machine 900. Circuitry (e.g., processing circuitry) is a collection of circuits implemented in tangible entities of the machine 900 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 900 follow.

In alternative embodiments, the machine 900 can operate as a standalone device or can be connected (e.g., networked) to other machines. In a networked deployment, the machine 900 can operate in the capacity of a server machine, a client machine, or both in server-client network environments. In an example, the machine 900 can act as a peer machine in peer-to-peer (P2P) (or other distributed) network environment. The machine 900 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 900 can include a hardware processor 902 (e.g., a central processing unit (CPU), a graphics processing unit (GPU), a hardware processor core, or any combination thereof), a main memory 904, a static memory (e.g., memory or storage for firmware, microcode, a basic-input-output (BIOS), unified extensible firmware interface (UEFI), etc.) 906, and mass storage 908 (e.g., hard drives, tape drives, flash storage, or other block devices) some or all of which can communicate with each other via an interlink (e.g., bus) 930. The machine 900 can further include a display unit 910, an alphanumeric input device 912 (e.g., a keyboard), and a user interface (UI) navigation device 914 (e.g., a mouse). In an example, the display unit 910, input device 912 and UI navigation device 914 can be a touch screen display. The machine 900 can additionally include a storage device (e.g., drive unit) 908, a signal generation device 918 (e.g., a speaker), a network interface device 920, and one or more sensors 916, such as a global positioning system (GPS) sensor, compass, accelerometer, or other sensor. The machine 900 can include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 902, the main memory 904, the static memory 906, or the mass storage 908 can be, or include, a machine readable medium 922 on which is stored one or more sets of data structures or instructions 924 (e.g., software) embodying or utilized by any one or more of the techniques or functions described herein. The instructions 924 can also reside, completely or at least partially, within any of registers of the processor 902, the main memory 904, the static memory 906, or the mass storage 908 during execution thereof by the machine 900. In an example, one or any combination of the hardware processor 902, the main memory 904, the static memory 906, or the mass storage 908 can constitute the machine readable media 922. While the machine readable medium 922 is illustrated as a single medium, the term "machine readable medium" can include a single medium or multiple media (e.g., a centralized or distributed database, or associated caches and servers) configured to store the one or more instructions 924.

The term "machine readable medium" can include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples can include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., electrically programmable read-only memory (EPROM), electrically erasable programmable read-only memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 922 can be representative of the instructions 924, such as instructions 924 themselves or a format from which the instructions 924 can be derived. This format from which the instructions 924 can be derived can include source code, encoded instructions (e.g., in compressed or encrypted form), packaged instructions (e.g., split into multiple packages), or the like. The information representative of the instructions 924 in the machine readable medium 922 can be processed by processing circuitry into the instructions to implement any of the operations discussed herein. For example, deriving the instructions 924 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 924.

In an example, the derivation of the instructions 924 can include assembly, compilation, or interpretation of the information (e.g., by the processing circuitry) to create the instructions 924 from some intermediate or preprocessed format provided by the machine readable medium 922. The information, when provided in multiple parts, can be combined, unpacked, and modified to create the instructions 924. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 924 can be further transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 920 can include one or more physical jacks (e.g., Ethernet, coaxial, or phone jacks) or one or more antennas to connect to the communications network 926. In an example, the network interface device 920 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software. A transmission medium is a machine readable medium.

In the foregoing specification, some example implementations of the disclosure have been described. It will be evident that various modifications can be made thereto without departing from the broader scope of the disclosure as set forth in the following claims. The specification and drawings are, accordingly, to be regarded in an illustrative sense rather than in a restrictive sense. Below is a non-exhaustive list of examples of implementations of the present disclosure.

Example 1 is a system comprising: logic configured to perform operations comprising: transmitting, to a destination, on a transfer cycle, multiple flow control units (flits), two or more of the multiple flits being part of a packet directed to a virtual channel of the destination; and based on the two or more of the multiple flits being sent on the transfer cycle and being part of the packet directed to the virtual channel, modifying data representing a number of credits for the virtual channel of the destination by reducing the number of credits by one.

In Example 2, the subject matter of Example 1 includes, wherein: a flit of the multiple flits is directed to a second virtual channel of the destination; and the operations further comprise: based on the flit being directed to the second virtual channel, reducing a second number of credits for the second virtual channel of the destination by one.

In Example 3, the subject matter of Examples 1-2 includes, wherein the operations further comprise: prior to the transmitting of the multiple flits, determining to send the packet based on the number of credits for the virtual channel of the destination, the count of the multiple flits, and the count of flits in the packet.

In Example 4, the subject matter of Example 3 includes, wherein: the multiple flits include one or more flits directed to a second virtual channel; and the determining to send the packet is further based on the count of the one or more flits for the second virtual channel.

In Example 5, the subject matter of Examples 1–4 includes, wherein: at least one of the flits that is directed to the virtual channel of the destination comprises an identifier of the virtual channel.

Example 6 is a non-transitory machine-readable medium that stores instructions that, when executed by a system, cause the system to perform operations comprising: transmitting, to a destination, on a transfer cycle, multiple flow control units (flits), two or more of the multiple flits being part of a packet directed to a virtual channel of the destination; and based on the two or more of the multiple flits being sent on the transfer cycle and being part of the packet directed to the virtual channel, modifying data representing a number of credits for the virtual channel of the destination by reducing the number of credits by one.

In Example 7, the subject matter of Example 6 includes, wherein: a flit of the multiple flits is directed to a second virtual channel; and the operations further comprise: based on the flit being directed to the second virtual channel, reducing a second number of credits for the second virtual channel of the destination by one.

In Example 8, the subject matter of Examples 6-7 includes, wherein the operations further comprise: prior to the transmitting of the multiple flits, determining to send the packet based on the number of credits for the virtual channel of the destination, the count of the multiple flits, and the count of flits in the packet.

In Example 9, the subject matter of Example 8 includes, wherein: the multiple flits comprises one or more flits directed to a second virtual channel; and the determining to send the packet is further based on the count of the one or more flits directed to the second virtual channel.

In Example 10, the subject matter of Examples 6-9 includes, wherein: at least one of the flits that is directed to the virtual channel of the destination comprises an identifier of the virtual channel.

Example 11 is a method comprising: transmitting, to a destination, on a transfer cycle, multiple flow control units (flits), two or more of the multiple flits being part of a packet directed to a virtual channel of the destination; and based on the two or more of the multiple flits being sent on the transfer cycle and being part of the packet directed to the virtual channel, modifying data representing a number of credits for the virtual channel of the destination by reducing the number of credits by one.

In Example 12, the subject matter of Example 11 includes, wherein: a flit of the multiple flits is directed to a second virtual channel; and the method further comprises: based on the flit being directed to the second virtual channel, reducing a second number of credits for the second virtual channel of the destination by one.

In Example 13, the subject matter of Examples 11-12 includes, wherein the method further comprises: prior to the transmitting of the multiple flits, determining to send the packet based on the number of credits for the virtual channel of the destination, the count of the multiple flits, and the count of flits in the packet.

In Example 14, the subject matter of Example 13 includes, wherein: the multiple flits include one or more flits directed to a second virtual channel; and the determining to send the packet is further based on the count of the one or more flits for the second virtual channel.

In Example 15, the subject matter of Examples 11-14 includes, wherein: at least one of the flits that is directed to the virtual channel of the destination comprises an identifier of the virtual channel.

Example 16 is a chiplet system comprising: a first chiplet comprising a memory controller, and further including logic configured to perform operations comprising: receiving, from a source, on a transfer cycle, multiple flow control units (flits), two or more of the multiple flits being directed to a first virtual channel, a flit of the multiple flits being directed to a second virtual channel; copying the two or more flits to a first buffer associated with the first virtual channel; and copying the flit to a second buffer associated with the second virtual channel.

In Example 17, the subject matter of Example 16 includes, wherein: the copying of the two or more flits to the first buffer is part of copying the multiple flits to the first buffer; and the operations further comprise: setting a bitmask associated with the first buffer, the bitmask indicating which of the multiple flits is directed to the first virtual channel.

In Example 18, the subject matter of Examples 16-17 includes, a processing device configured to perform second operations comprising: assembling a data packet from data in the first buffer, the data packet comprising a set of flits including the two or more flits and additional flits received on one or more additional transfer cycles, each flit of the set of flits being directed to the first virtual channel; and causing the hardware transceiver to send a credit return packet to the source, the credit return packet returning one credit for each transfer cycle on which at least one flit of the set of flits was received, the credit indicating buffer space available for the source.

In Example 19, the subject matter of Example 18 includes, wherein the credit return packet indicates the first virtual channel.

Example 20 is a non-transitory machine-readable medium that stores instructions that, when executed by a system, cause the system to perform operations comprising: receiving, from a source, on a transfer cycle, multiple flow control units (flits), two or more of the multiple flits being directed to a first virtual channel, a flit of the multiple flits being for a second virtual channel; copying the two or more flits to a first buffer associated with the first virtual channel; and copying the flit to a second buffer associated with the second virtual channel.

In Example 21, the subject matter of Example 20 includes, wherein: the copying of the two or more flits to the first buffer is part of copying the multiple flits to the first buffer; and the operations further comprise: setting a bitmask associated with the first buffer, the bitmask indicating which of the multiple flits is for the first virtual channel.

In Example 22, the subject matter of Examples 20-21 includes, wherein the operations further comprise: assembling a data packet from data in the first buffer, the data packet comprising a set of flits including the two or more flits and additional flits received on one or more additional transfer cycles, each flit of the set of flits being directed to the first virtual channel; and sending a credit return packet to the source, the credit return packet returning one credit for each transfer cycle on which at least one flit of the set of flits was received, the credit indicating buffer space available for the source.

In Example 23, the subject matter of Example 22 includes, wherein the credit return packet indicates the first virtual channel.

Example 24 is a method comprising: receiving, from a source, on a transfer cycle, multiple flow control units (flits), two or more of the multiple flits being directed to a first virtual channel, a flit of the multiple flits being directed to a second virtual channel; copying the two or more flits to a first buffer associated with the first virtual channel; and copying the flit to a second buffer associated with the second virtual channel.

In Example 25, the subject matter of Example 24 includes, wherein: the copying of the two or more flits to the first buffer is part of copying the multiple flits to the first buffer; and the method further comprises: setting a bitmask associated with the first buffer, the bitmask indicating which of the multiple flits is directed to the first virtual channel.

In Example 26, the subject matter of Examples 24-25 includes, assembling, by a processing device, a data packet from data in the first buffer, the data packet comprising a set of flits including the two or more flits and additional flits received on one or more additional transfer cycles, each flit of the set of flits being directed to the first virtual channel; and causing, by the processing device, a hardware transceiver to send a credit return packet to the source, the credit return packet returning one credit for each transfer cycle on which at least one flit of the set of flits was received, the credit indicating buffer space available for the source.

In Example 27, the subject matter of Example 26 includes, wherein the credit return packet indicates the first virtual channel.

Example 28 is at least one machine-readable medium including instructions that, when executed by processing circuitry, cause the processing circuitry to perform operations to implement of any of Examples 1-27.

Example 29 is an apparatus comprising means to implement of any of Examples 1-27.

Example 30 is a system to implement of any of Examples 1-27.

Example 31 is a method to implement of any of Examples 1-27.

What is claimed is:

1. A system comprising:
logic configured to perform operations comprising:
    transmitting, to a destination, on a transfer cycle, multiple flow control units (flits), two or more of the multiple flits being part of a packet directed to a virtual channel of the destination; and
    based on the two or more of the multiple flits being sent on the transfer cycle and being part of the packet directed to the virtual channel, modifying data representing a number of credits for the virtual channel of the destination by reducing the number of credits by one.

2. The system of claim 1, wherein:
a flit of the multiple flits is directed to a second virtual channel of the destination; and
the operations further comprise:
    based on the flit being directed to the second virtual channel, reducing a second number of credits for the second virtual channel of the destination by one.

3. The system of claim 1, wherein the operations further comprise:
prior to the transmitting of the multiple flits, determining to send the packet based on the number of credits for the virtual channel of the destination, the number of the multiple flits, and the number of flits in the packet.

4. The system of claim 3, wherein:
the multiple flits include one or more flits directed to a second virtual channel; and
the determining to send the packet is further based on the number of the one or more flits for the second virtual channel.

5. The system of claim 1, wherein:
at least one of the flits that is directed to the virtual channel of the destination comprises an identifier of the virtual channel.

6. The system of claim 1, wherein:
the transmitting to the destination of the multiple flits comprises transmitting the multiple flits via a chiplet mesh.

7. The system of claim 1, wherein the operations further comprise:
modifying the data representing the number of credits for the virtual channel of the destination based on data in a credit return packet received from the destination.

8. A non-transitory machine-readable medium that stores instructions that, when executed by a system, cause the system to perform operations comprising:
transmitting, to a destination, on a transfer cycle, multiple flow control units (flits), two or more of the multiple flits being part of a packet directed to a virtual channel of the destination; and
based on the two or more of the multiple flits being sent on the transfer cycle and being part of the packet directed to the virtual channel, modifying data representing a number of credits for the virtual channel of the destination by reducing the number of credits by one.

9. The machine-readable medium of claim 8, wherein:
a flit of the multiple flits is directed to a second virtual channel; and
the operations further comprise:
    based on the flit being directed to the second virtual channel, reducing a second number of credits for the second virtual channel of the destination by one.

10. The machine-readable medium of claim 8, wherein the operations further comprise:
prior to the transmitting of the multiple flits, determining to send the packet based on the number of credits for the virtual channel of the destination, the number of the multiple flits, and the number of flits in the packet.

11. The machine-readable medium of claim 10, wherein:
the multiple flits comprises one or more flits directed to a second virtual channel; and
the determining to send the packet is further based on the number of the one or more flits directed to the second virtual channel.

12. The machine-readable medium of claim 8, wherein:
at least one of the flits that is directed to the virtual channel of the destination comprises an identifier of the virtual channel.

13. The machine-readable medium of claim 8, wherein:
the transmitting to the destination of the multiple flits comprises transmitting the multiple flits via a chiplet mesh.

14. The machine-readable medium of claim 8, wherein the operations further comprise:

modifying the data representing the number of credits for the virtual channel of the destination based on data in a credit return packet received from the destination.

15. A method comprising:
transmitting, to a destination, on a transfer cycle, multiple flow control units (flits), two or more of the multiple flits being part of a packet directed to a virtual channel of the destination; and
based on the two or more of the multiple flits being sent on the transfer cycle and being part of the packet directed to the virtual channel, modifying data representing a number of credits for the virtual channel of the destination by reducing the number of credits by one.

16. The method of claim 15, wherein:
a flit of the multiple flits is directed to a second virtual channel; and
the method further comprises:
based on the flit being directed to the second virtual channel, reducing a second number of credits for the second virtual channel of the destination by one.

17. The method of claim 15, wherein the method further comprises:
prior to the transmitting of the multiple flits, determining to send the packet based on the number of credits for the virtual channel of the destination, the number of the multiple flits, and the number of flits in the packet.

18. The method of claim 17, wherein:
the multiple flits include one or more flits directed to a second virtual channel; and
the determining to send the packet is further based on the number of the one or more flits for the second virtual channel.

19. The method of claim 15, wherein:
at least one of the flits that is directed to the virtual channel of the destination comprises an identifier of the virtual channel.

20. The method of claim 15, wherein:
the transmitting to the destination of the multiple flits comprises transmitting the multiple flits via a chiplet mesh.

* * * * *